Figure 1:
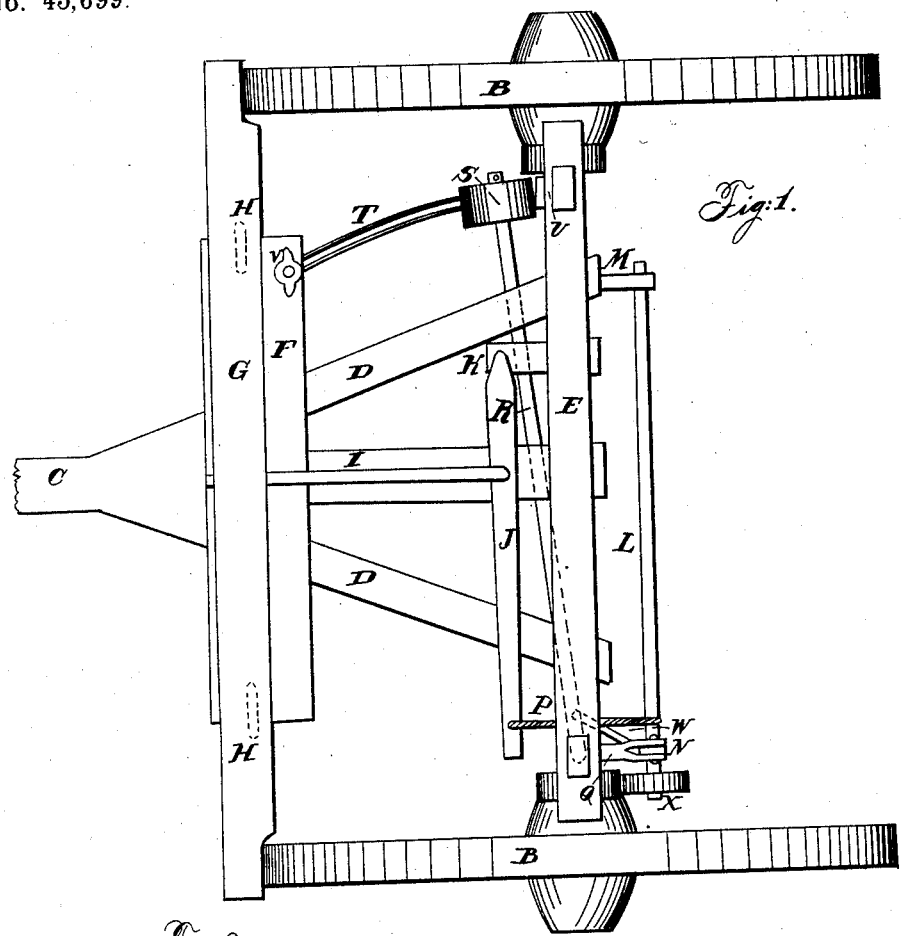

L. R. CARPENTER.
Carriage-Brake.

No. 45,699.

Patented Jan. 3, 1865.

Witnesses
S. Russell
I. E. Dennis

Inventor
L. R. Carpenter
By his Attorney
I. Dennis Jr.

UNITED STATES PATENT OFFICE.

LEWIS R. CARPENTER, OF LANCASTER, OHIO.

IMPROVEMENT IN WAGON AND CARRIAGE BRAKES.

Specification forming part of Letters Patent No. 45,699, dated January 3, 1865; antedated August 19, 1862.

*To all whom it may concern:*

Be it known that I, LEWIS R. CARPENTER, of Lancaster, in the county of Fairfield and State of Ohio, have invented certain new and useful Improvements in Wagon and Carriage Brakes; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 2:
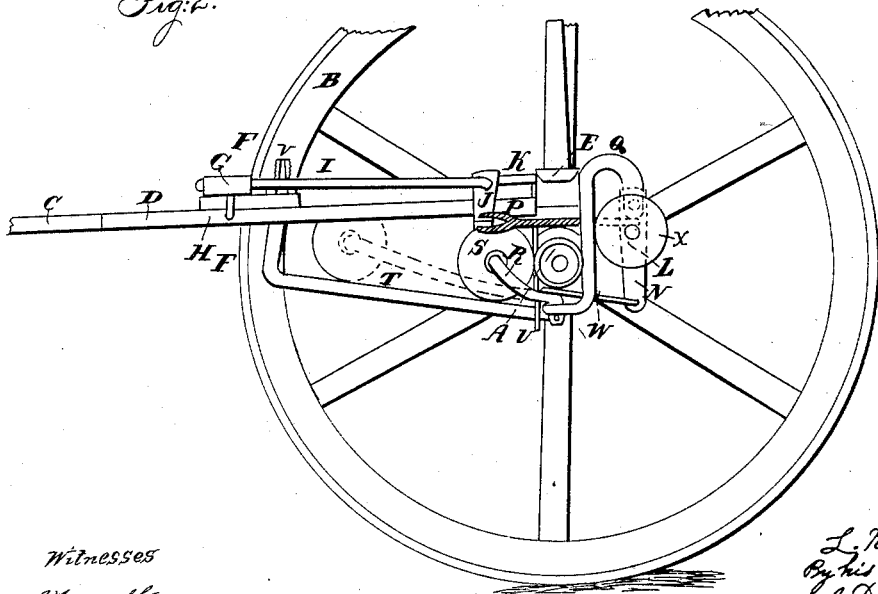

Figure 1 is a plan or top view of such parts of a wagon as are necessary to show my improvements. Fig. 2 is an elevation of the same without one of the wheels.

The nature of my invention and improvements in carriage-brakes consists in arranging a horizontal lever with a roller on it, to roll or traverse on a bar, which is inclined when the carriage begins to descend a hill, and the roller rolls down the bar and operates the devices which apply the brake, and when the carriage passes onto a level road the roller rolls back and releases the brake, thus constituting a self-applying and a self releasing brake of great utility.

In the accompanying drawings, A is the axle, B B the wheels, C the perch, and D D the hounds or braces supporting the perch. E is the bed-piece, fastened on the axle A. F is a bar fastened to the perch and hounds for the brake-bar G to traverse on, which is held in its place on the bar F by the brackets H H. (Shown by dotted lines in Fig. 1.) The rod I, which operates the brake-bar, connects it to the lever J, which has its fulcrum in the stand K, fastened in the bed E. The lever J is connected by a strap or chain, P, to the shaft L, on the opposite side of the axle, which shaft turns in the stand M, fastened in the axle and in the lever N, which is hung in the stand Q, which stand is also fastened to the axle.

The stand Q may be made in the form represented, to extend down below the axle, and is perforated for the end of the lever R, which extends across in front of the axle and has a heavy roller, S, fitted to turn freely on it, which roller rolls freely on the bar T, arranged for that purpose. One end of this bar is supported by the stand U, fastened to the axle. The other end is bent up and passes through the bar F, and is provided with a screw-nut, v. By turning this nut the forward end of the bar may be adjusted higher or lower, as desired. The lower end of the lever N is connected by the link W to the lever R, as shown in the drawings, Fig. 2, and there is a roller, X, fastened to the end of the shaft L, which is turned by the hub of the wheel to wind the chain P and apply the brake to the wheels.

The roller X may be so arranged as to be turned by the periphery of the wheel instead of the hub, if preferred that way.

The operation of this self-acting brake is as follows, to wit: The bar T is adjusted by the nut V, so that when the wagon or carriage is traveling on level ground the roller S will roll back against the axle, and the brake will leave the wheels free to turn; but as soon as the wagon begins to descend a hill, and the perch or tongue is depressed the roller S rolls from the axle, carrying the lever R, which acts on the lever N through the link W and draws the roller X against the hub of the wheel, which turns it, and winds the chain P and operates the lever J, and applies the brake to the wheels. As soon as the wagon comes onto the level road and the perch is raised the roller S rolls back against the axle and releases the brake from the wheels.

I contemplate that the bar T may be so arranged that it may be operated by the driver, or that the lever R may be operated by the driver so as to apply the brake on a level road, when desired. I believe I have described and represented my improved brake for carriages so as to enable any person skilled in the art to make and use it. I will now state what I desire to secure by Letters Patent.

I claim—

Arranging the lever R horizontally and making the weight upon it to roll or traverse on a bar, substantially as described, for the purpose specified, and, in combination with the lever R and weight or roller S, the link W, lever N, shaft L, and roller X, substantially as described.

L. R. CARPENTER.

Witnesses:
J. A. REAM,
M. A. REAM.